United States Patent [19]
Jacobs et al.

[11] Patent Number: 5,722,618
[45] Date of Patent: Mar. 3, 1998

[54] AIRBORNE TETHERED SENSOR SYSTEM

[75] Inventors: Delbert H. Jacobs, Oxnard; Eiichi Kamiya, Rolling Hills Estates; Aldo Spadoni, Rancho Palos Verdes, all of Calif.

[73] Assignee: Northrop Grumman Corporation, Los Angeles, Calif.

[21] Appl. No.: 700,140

[22] Filed: Aug. 20, 1996

Related U.S. Application Data

[63] Continuation of Ser. No. 291,374, Aug. 16, 1994, abandoned.

[51] Int. Cl.[6] .................................................. B64D 9/00
[52] U.S. Cl. ............................... 244/137.1; 244/138 R
[58] Field of Search ............................. 244/1 R, 2, 3, 244/137.1, 138 R; 364/4, 14; 258/1.4, 1.1

[56] References Cited

U.S. PATENT DOCUMENTS

| | | | |
|---|---|---|---|
| 1,829,474 | 10/1931 | Chilowsky | 244/138 R |
| 2,298,912 | 10/1942 | Alabrune | 244/138 R |
| 2,551,596 | 5/1951 | Haglund | |
| 3,373,994 | 3/1968 | Woodward | |
| 3,724,817 | 4/1973 | Simons | 258/1.4 |
| 3,943,357 | 3/1976 | Culver | 250/199 |
| 4,126,203 | 11/1978 | Miller | 367/14 |
| 4,260,187 | 4/1981 | Bejczy | 244/161 |
| 4,868,796 | 9/1989 | Ahrens | 414/730 |
| 5,070,483 | 12/1991 | Berni | 367/14 |
| 5,088,663 | 2/1992 | Henson | 244/137.4 |
| 5,109,362 | 4/1992 | Berni | 367/14 |

*Primary Examiner*—Galen L. Barefoot
*Attorney, Agent, or Firm*—Terry J. Anderson; Karl J. Hoch, Jr.

[57] ABSTRACT

An airborne sensor system and method for placing a tethered payload in a near-stationary horizontal and vertical position at a desired location in relation to a target. The system includes an aircraft flying in a near-circular flight path, a tether connected at a first end to the aircraft and at a second end to a payload section, and an electronic device or devices for determining the location of the payload section. In addition, the airborne sensor system may include an apparatus for moving the payload section horizontally to the desired location and maintaining it at that location, independent of moving the aircraft.

32 Claims, 3 Drawing Sheets

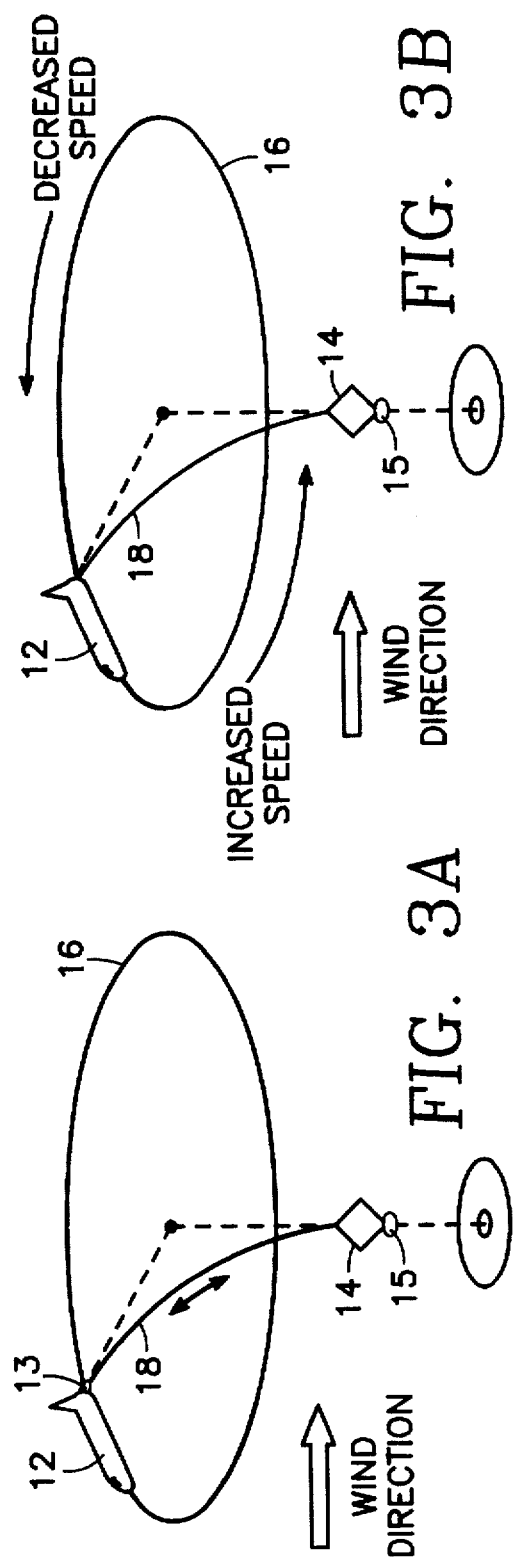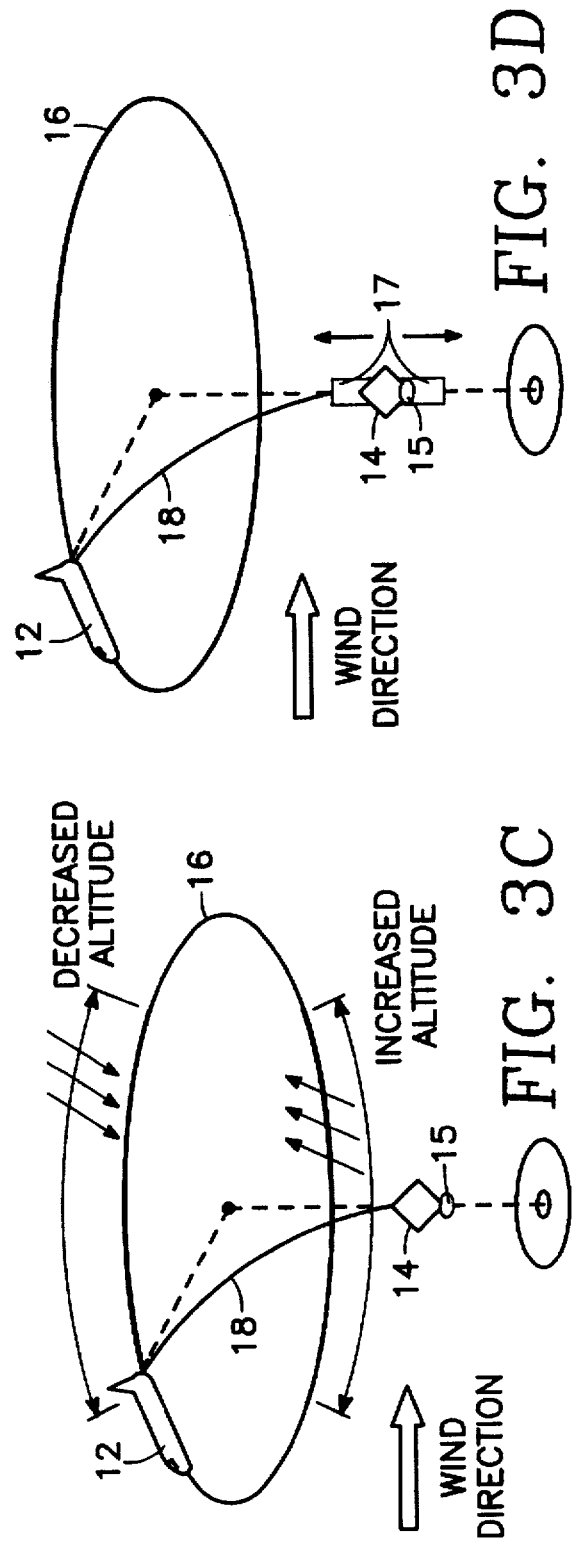

AIRBORNE TETHERED SENSOR SYSTEM

This is a continuation, of application Ser. No. 08/291,374, filed Aug. 16, 1994, now abandoned.

BACKGROUND OF THE INVENTION

1. Technical Field

This invention relates to a system and method for positioning a tethered payload section towed from an aircraft in the vicinity of a target, and particularly to such a system and method employing electronic devices for determining the location of the payload section in relation to the target and precisely placing the payload section in a near-stationary position at a desired location in relation to the target.

2. Background Art

The remote positioning of a tethered payload section towed from an aircraft and maintained in a near-stationary position over a target, has many useful applications. For example, the payload section could take the form of expendable items such as ordnance, electronic warfare equipment, psychological warfare packages or ground implantable sensors, which once positioned aloft can be lowered onto or in the vicinity of the target. Alternately, the payload section could consist of a sensor array which is suspended over a target for surveillance, intelligence gathering and targeting purposes. Some specific examples of the types of sensors that might be employed include those used for electro-optical/infrared imaging, the detection of acoustic, radio frequency (RF), magnetic and electromagnetic signals, or the detection of chemical and radiation sources, among others. Another possible use for a near-stationary tethered payload could be lowering and recovery of sensors, objects, or even humans, to the surface. The array could also include devices to obtain samples of the soil, air, or water in the proximity of the target.

It is noted that the term "near-stationary" used in conjunction with positioning a payload section in relation to a target refers to the degree to which the payload section moves vertically and horizontally away from a point on an imaginary line extending vertically from a location of interest, such as a target on the ground. In a near-stationary horizontal position, the horizontal movements are minimized, and in a near-stationary vertical position the vertical movements are minimized.

Formerly, the remote placement of a tethered payload section near a target was accomplished via the following method. An aircraft, with the payload section tethered behind it by the appropriate tether connections, establishes a circular flight path over the target on the ground. This causes the tether to stall and the payload section to drop toward the target. The payload section reaches an equilibrium condition where it attains a near-stationary horizontal position relative to the ground. The average vertical height of the payload above the target is established by various methods including varying the length of the tether, the speed of the aircraft, the radius of the circular flight path, or the altitude of the aircraft. However, the payload's actual height will vary due to oscillations created by the relative wind and wind shear in the area. As shown in FIG. 1a, when the aircraft 12 is flying into the wind, the payload section 14 tends to rise. The payload section rises because the tether 18 acts as an air foil. The resulting lifting forces 19 on the tether 18 causes it to rise, thereby pulling the payload section 14 up, as well. However, as shown in FIG. 1b, when the aircraft 12 is flying downwind, the lifting forces on the tether 18 are gone and the payload section 14 tends to drop back down in altitude. Therefore, accurate vertical placement of the payload is not realized.

In addition, it has been left to the skill of the pilot of the aircraft (or a controller if the aircraft is unmanned), to position the payload section over the target, relying on visual observations from the aircraft (or from the controller's position). This method of placement is obviously inexact due to the long distances typically separating the pilot (or controller) from the target.

Accordingly, what is needed is a system for more precisely placing the tethered payload section at a desired position in relation to the target.

It is, therefore, an object of the present invention to provide a system and method for placing a tethered payload section towed from an aircraft in a near-stationary position at a desired location in relation to the target wherein vertical oscillations of the payload section are minimized.

It is another object of the present invention to provide a system and method for placing a tethered payload section towed from an aircraft in a near-stationary position at a desired location in relation to the target wherein electronic devices are employed to determine the location of the payload section in relation to the target so as to place the payload section more precisely than possible with mere pilot or controller observations.

It is yet another object of the present invention to provide a system and method for placing a tethered payload section towed from an aircraft in a near-stationary position at a desired location in relation to the target, independent of moving the aircraft, wherein a controllable thrust device or devices disposed in the payload section are employed to push the payload section horizontally to the desired location and maintain it at that location.

In addition, further objectives, applications and benefits of the invention will become apparent from the detailed description which follows hereinafter when taken in conjunction with the drawing figures which accompany it.

SUMMARY

The foregoing objects have been attained generally by an airborne sensor system and method for placing a tethered payload in a near-stationary horizontal and vertical position at a desired location in relation to a target. This airborne sensor system includes an aircraft flying in a near-circular flight path, a tether connected at a first end to the aircraft and at a second end to a payload section, and an electronic device for determining the location of the payload section.

The electronic determining device can be a global positioning system (GPS) navigator disposed in the aircraft for determining the global coordinates of the aircraft. The GPS navigator is used for facilitating the repositioning of the aircraft by ensuring the global coordinates of a center of the aircraft's near-circular flight path closely correspond to the predetermined global coordinates of the aforementioned desired location. This allows the placement of the payload section in the near-stationary horizontal position at the desired location.

Alternately, the electronic determining device can be a GPS navigator disposed in the payload section for determining the global coordinates of the payload section. In this case the GPS navigator is used for facilitating the repositioning of the aircraft such that the global coordinates of the payload section closely correspond to predetermined global coordinates of the desired location. Again, this allows for the placement of the payload section in the near-stationary horizontal position at the desired location.

The electronic determining device can also take the form of sensors disposed in the payload section for detecting emanations from a target and for determining a location of the target in relation to the payload section. These sensors facilitate the repositioning of the aircraft to move the center of the aircraft's near-circular flight path either over the target, or to a location having a predetermined offset from the target. Once again, this allows for the placement of the payload section in the near-stationary horizontal position at the desired location in relation to the target. It is also noted that the sensors can take the form of video equipment which provide images of the scene surrounding the payload section. In addition, the airborne sensor system need not be passive in nature. The aforementioned sensors can include devices for emitting reflective signals. These reflective signals reflect off of the target and are subsequently detected by the sensors disposed in the payload section.

The payload sensors can be combined with either of the aforementioned GPS navigator configurations to create a dual detecting apparatus. Thus, the GPS navigator allows for a first positioning of the payload, and then the sensors are used for a more accurate positioning.

The features for placement of the payload section in the near-stationary horizontal position at the desired location embodied by the present invention having now been summarized, the features for placement of the payload section in the near-stationary vertical position will be discussed. Once the payload section's average vertical height has been established in relation to the target by any of the previously discussed methods (i.e. varying the length of the tether, the speed of the aircraft, the radius of the circular flight path, or the altitude of the aircraft), the payload section is stabilized for wind-caused vertical oscillations via one or more of the following procedures. A sensor, disposed in the electronic determining device of the payload section, can be included for determining the altitude of the payload section. The payload section is repositioned vertically employing the readout from the altitude sensor, and changing either the length of the tether, the speed off the aircraft, the altitude of the aircraft, or via the use of vertical thruster devices disposed in the payload section. In the first method, the payload section is placed in the near-stationary vertical position at the desired location by reeling out the tether using a winch disposed in the aircraft to lower the payload section from the aircraft, and reeling in the tether with the winch to raise the payload section toward the aircraft. Alternately, changing the length of the tether involves reeling out the tether using a winch disposed in the payload section to lower the payload section away the aircraft, and reeling in the tether with the winch to raise the payload section toward the aircraft. The payload section is reeled in or out, as appropriate in either embodiment, to place the payload section at the desired height and to maintain it at that desired vertical location.

The aforementioned method involving changing the speed of the aircraft includes increasing the speed of the aircraft whenever the aircraft is flying downwind, and decreasing the speed of the aircraft whenever the aircraft is flying into the wind. This method is used to maintain the payload section at approximately the desired height even though wind impinging on the tether tends to raise the payload section when the aircraft is flying upwind and lower the payload section when the aircraft is flying downwind. The decrease in upwind speed reduces lift on the tether, and so compensates for the aforementioned wind-caused lift. Also, the increase in downwind speed increases lift on the tether, thereby compensating for the loss of the wind-caused lift. Thus, the payload section is maintained at approximately the desired vertical height.

The method mentioned above involving changing the altitude of the aircraft includes increasing the altitude of the aircraft whenever the aircraft is flying downwind, and decreasing the altitude of the aircraft whenever the aircraft is flying upwind. This process of changing the altitude of the aircraft compensates for the aforementioned wind-caused oscillation of the payload section.

The aforementioned method for changing the vertical position of the payload section using a vertical thruster device includes activating the vertical thruster device to push the payload section vertically to a location corresponding to the desired location and maintaining the payload section at the desired location.

Thus far, the movement of the payload section in the horizontal direction has involved repositioning of the aircraft. However, the airborne sensor system can further include an apparatus for moving the payload section horizontally to the desired location and maintaining the payload section at the desire location, independent of moving the aircraft. This is accomplished by the addition of a controllable thrust device disposed in the payload section and rotatable about the circumference of the payload section, and a controller for controlling the thrust device. The controller is used to rotate the thrust device to an appropriate a point on the circumference of the payload section and to activate it so as to push the payload section in a direction corresponding to the desired location, and maintain it at that location. Alternately, a plurality of controllable thrust devices can be disposed about the circumference of the payload section. In this embodiment, a thrust controller controls the thrust devices by causing at least one of the thrust devices to be activated so as to push the payload section in a direction corresponding to the desired location and maintain it at that location. Either of these embodiments provides an even more accurate placement of the payload, than would be possible from repositioning the aircraft alone.

DESCRIPTION OF THE DRAWINGS

These and other features, aspects, and advantages of the present invention will become better understood with regard to the following description, appended claims, and accompanying drawings where:

FIGS. 3a–d are diagrams representing the positioning of a tethered payload section towed from an aircraft in a near-stationary vertical position over a target.

DETAILED DESCRIPTION OF THE PREFERRED EMBODIMENTS

Figure 1A:
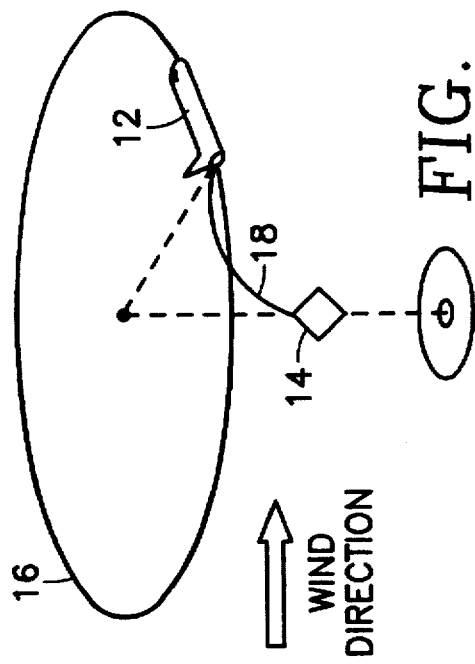
FIGS. 1a–b are diagrams representing the effect of wind direction on the vertical positioning of a tethered payload section towed from an aircraft flying in a near-circular flight path.
Figure 1B:
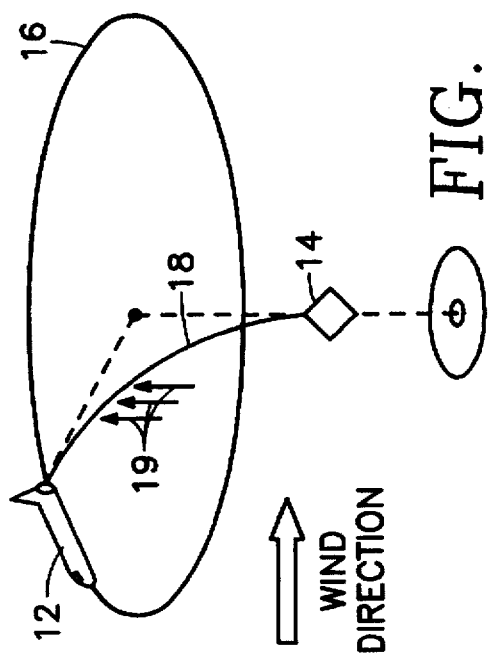
Figure 2:
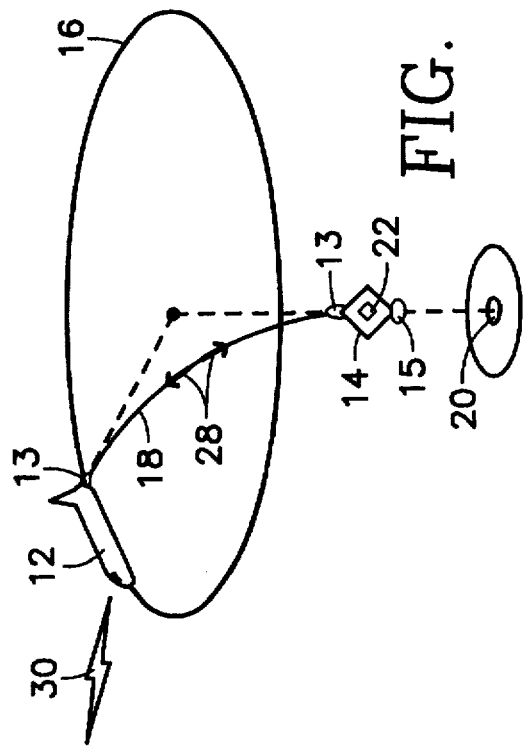
FIG. 2 is a diagram representing the positioning of a tethered payload section towed from an aircraft in a near-stationary horizontal position over a target employing a global positioning system (GPS) navigator installed in the aircraft.
Figure 4:
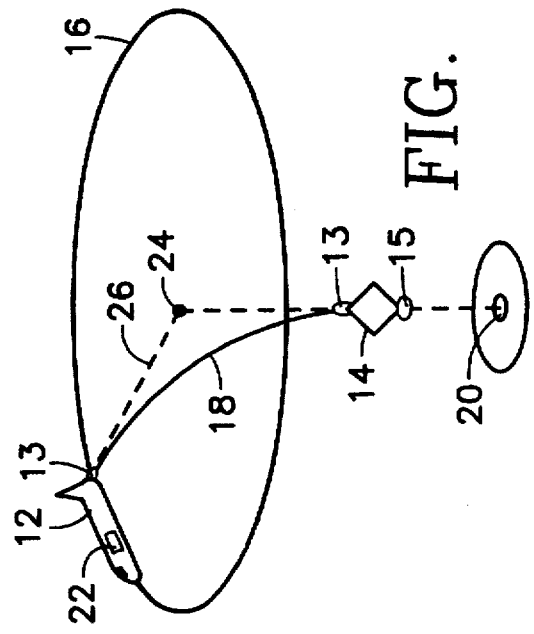
FIG. 4 is a diagram representing the positioning of a tethered payload section towed from an aircraft in a near-stationary horizontal position over a target employing a global positioning system (GPS) navigator installed in the payload section.

One embodiment of the system for precisely placing a tethered payload section towed from an aircraft in a near-stationary position in relation to a target, according to the present invention, is shown in FIG. 2. As can be seen, an aircraft 12, with a payload section 14 tethered behind it, establishes the appropriate near-circular flight path 16. This causes the tether 18 to trail to near vertical and the payload section 14 to attain a near-stationary horizontal position relative to a desired location 20.

However, the system depicted in FIG. 2 is susceptible to wind which would cause the vertical height of the payload section to oscillate, as previously described. This vertical oscillation can be minimized in various ways.

One method is shown in FIG. 3a. A winch 13, disposed either in the aircraft 12 (shown) or the payload section 14 (not shown), is used to raise or lower the payload section 14. Whenever the wind causes the payload section 14 to lift away from the desired location, the winch 13 reels out the tether 18 to compensate. Similarly, if the loss of the wind-caused lift on the tether 18 when the aircraft 12 is moving downwind, results in the payload section 14 dropping from the desired location, the winch 13 takes up the tether 18 to compensate.

The length of the tether 18, and the speed at which it is reeled in or out, could be calculated using the wind speed and the dynamics of the system, via well known mathematical methods. However, it is preferred that the payload section 14 include an altimeter 15 for this purpose. The readout of the altimeter 15 is transferred to the aircraft 12 via methods to be discussed later. This data is used by the pilot, or controller if the aircraft 12 is unmanned, to iteratively reel the winch 13 in and out, so as to substantially dampen any vertical oscillations of the payload section 14 caused by the wind.

A second method to compensate for vertical oscillations of the payload section 14 due to wind, is shown in FIG. 3b. In this method, the speed of the aircraft 12 is varied over the near-circular flight path 16. When the aircraft 12 is flying downwind, speed can be increased. The payload section 14 tends to drop in altitude when the aircraft 12 is flying downwind due to the loss of the aforementioned wind-caused lift on the tether 18. However, the payload would tend to rise as the speed of the aircraft 12 increases, due to an increased speed-caused lift on the tether 18. Therefore, if the payload section 14 begins to drop away from the desired location on the downwind leg of the aircraft's near-circular flight path 16, the speed can be increased to compensate. Conversely, to compensate for the tendency of the payload section 14 to rise from the desired location when the aircraft is flying upwind, the speed of the aircraft 12 is decreased. This slower speed decreases the lift on the tether 18, thereby counteracting the increased lift due to the wind. Therefore, the payload section 14 is maintained at approximately the same altitude. The rate at which the speed of the aircraft 12 is increased or decreased is determined iteratively using the signal from the altimeter 15 disposed in the payload section. However, as with the winch method, the rate of change of the speed could be calculated via well known mathematical methods, given the speed of the wind and the dynamics of the system illustrated in FIG. 3b.

Another method of compensating for the aforementioned wind-caused vertical oscillations of the payload section 14, shown in FIG. 3c, involves varying the altitude of the aircraft 12 over its nearly-circular flight path 16. Since the payload section 14 tends to rise on the upwind leg of the aircraft's near-circular flight path 16, the altitude of the aircraft 12 would be decreased. This decrease in the aircraft's altitude causes gravity to pull the payload section 14 downward. Thus, the wind-caused upward movement of the payload section 14 is dampened. Conversely, when the aircraft 12 is flying downwind, the payload section 14 may drop away from the desired location due to the loss of the wind-caused lifting force on the tether 18. In this case, the altitude of the aircraft 12 is increase to compensate. Here again, the degree to which the altitude of the aircraft 12 is increased or decreased over the flight path 16 is determined iteratively using the altimeter data, or calculated mathematically via well known methods.

One further method of compensating for the aforementioned wind-caused vertical oscillations of the payload section 14, shown in FIG. 3d, involves changing the vertical position of the payload section 14 using a vertical thruster 17. Whenever the payload section 14 begins to rise due to the wind-cause lift on the tether 18, the vertical thruster 17 is activated by the pilot or controller (or computer) to push the payload section downward, thereby holding the payload section 14 at about the desired height. If the payload section 14 begins to drop from the desired location on the downwind leg of the aircraft's near-circular flight path 16, the thruster 17 can be activated to push the payload section 14 upward, thus holding it close to the desired position. Thus, here again, the wind-caused vertical movement of the payload section 14 is dampened. The amount of upward or downward thrust provided by the vertical thruster 17 is determined iteratively using the altimeter data, or calculated mathematically via well known methods. Thrust devices suitable for use as the vertical thruster 17, and their associated controllers, are well known in the art. Therefore, no further description is provided herein.

It is noted that a combination of these above-described compensation methods for vertical oscillations of the payload section 14 due to wind can be employed. A combination could be particularly useful where wind conditions are so extreme that one method alone is not sufficient to place the payload section 14 in a near-stable position at the desired location. It is also noted that although the above-described compensation methods have been described in connection with the embodiment of the present invention shown in FIG. 2, they are equally applicable to other embodiments of the invention. In addition, even though FIGS. 2 and 4-6 depict a level, uniform speed flight path 16, this flight path 16 can be modified in accordance with any of the methods shown in FIGS. 3a-d.

Referring, once again to FIG. 2, the precise placement of the tethered payload section 14 towed from the aircraft 12 in a near-stationary horizontal position in relation to a target, will now be discussed. The aircraft 12 is equipped with a global positioning system (GPS) navigator 22, of the type well-known in the aviation field. The GPS navigator 22 allows the aircraft 12 attain its near-circular flight path 16, with the center 24 above the desired location 20. This is accomplished in the following manner. The pilot of the aircraft 12, or the controller if the aircraft 12 is unmanned and remotely controlled, has available the global coordinates of the desired location 20. These global coordinates correspond to the latitude and longitude of a location on the earth's surface. The GPS 22 provides the global coordinates of the surface location directly under the aircraft 12. The pilot or controller then iteratively repositions the aircraft 12 while maintaining the near-circular fight path 16, until the aircraft's position is nearly equidistant from the global coordinates of the desired target location 20 at all times. The resulting offset corresponds to the radius 26 of the near-circular flight path 16.

As those skilled in the art will no doubt recognize, the position of the aircraft 12 which will place the payload section 14 in the desired location 20, need not be determined by the pilot or controller, but could be determined automatically via the use of a computer operating on the aircrafts flight data and an appropriate algorithm for flying the resultant near-circular trajectory. Since, such algorithms are well-known in the art and do not constitute a novel part of the present invention, no detailed description is provided herein.

It is noted that the desired location 20 need not directly correspond to the target. The payload section 14 could just as easily be placed in a position which is offset from the actual target location. This would be useful, for example, where the payload section 14 includes sensors which will not function efficiently when place directly above the actual target location. Offsetting the payload section 14 would also be useful when it is desired to distance the payload section 14 from a threat existent at the actual target location.

The use of the GPS navigator 22 provides considerable improvement in the placement accuracy of the payload section 14, over that obtainable via the pilot or controller attempting to do so by mere visual observation from the aircraft 12 or control location. In addition, the use of the GPS navigator 22 allows placement of the payload section at times when visual observation would be impossible, such as at night or when weather conditions obscure the target.

The degree of improved accuracy provided by the GPS navigator 22 disposed in the aircraft 12 depends on atmospheric conditions, such as wind, which might push the payload section 14 from its near-vertical hanging position. However, this inaccuracy can be all but eliminated by incorporating a GPS navigator 22 in the payload section 14. This configuration is shown in FIG. 3. The GPS navigator 22, included in the payload section 14, provides the pilot or controller of the aircraft 12 (or a computer which is programmed to determine the correct position for the aircraft 12) with information to null the location difference between the actual global coordinates of the payload section 14, and those of a desired location 20. In this case, the aircraft 12 would be repositioned until the coordinates provided by the GPS navigator 22 in the payload section 14 closely match those of the desired location 20 at all points in the aircraft's near-circular path 16.

Preferably, the coordinate information from the GPS navigator 22 in the payload section 14 would be routed to the aircraft 12 via a communication link 28 incorporated in the tether 18. For instance, the communication link 28 could consist of a fiber optic line or lines, running the length of the tether 18 with connections at both ends for mating to the appropriate equipment in the aircraft 12 and the payload section 14, respectively. In addition, if the payload section 14 includes sensors, the associated sensor data could also be routed by this communications link 28. Further, commands from the aircraft 12 to the payload section 14 would be routed via the communications link 28. For example, a command to a release or lower a sensor, ordnance device, etc. consisting of all or part of the payload section 14 could be transferred in this way. Similarly, instructions could be routed to sensors existent in the payload section 14 by this two-way communications link 28, as well. Although a fiber optic communications link 28 is preferred because the data can not be intercepted and a high data transfer rate is possible, other one or two-way communication links could be employed in appropriate circumstances. For instance, radio frequency communications between the aircraft 12 or controller and the payload section 14 is one possibility. Other possibilities include the use of lasers, or simple electrical wires routed along the tether 18.

In the case of a remotely controlled aircraft 12, signals from the payload section 14 to the aircraft 12, and commands from the aircraft 12 to the payload section 14 would also be routed to and from the controller at a remote ground or airborne control station via an appropriate command, control and communications datalink 30 of a type well known in the art.

The aforementioned lowering of the payload section 14 is preferably accomplished by incorporating a winch 13 either in the aircraft 12, or in the payload section 14, such as was described in connection with the discussion of methods to minimize vertical oscillations of the payload section 14 in the presence of wind. The tether 18 would be reeled out to lower the payload section 14 towards the ground. In this way, implantable sensors, ordnance, sampling devices, etc. can be placed at the desired location 20. Similarly, the sensors, sampling devices, or even a human being could be retrieved from the desired location 20 by reeling in the lowered tether 18. Although the use of a winch 13 is preferred, those skilled in the art will recognize that the vertical height of the payload section 14 could be adjusted in other ways. For instance, the radius of the near-circular flight path 16 of the aircraft 12 could be increased to raise the payload section 14, or decreased to lower it.

Figures 5, 6:
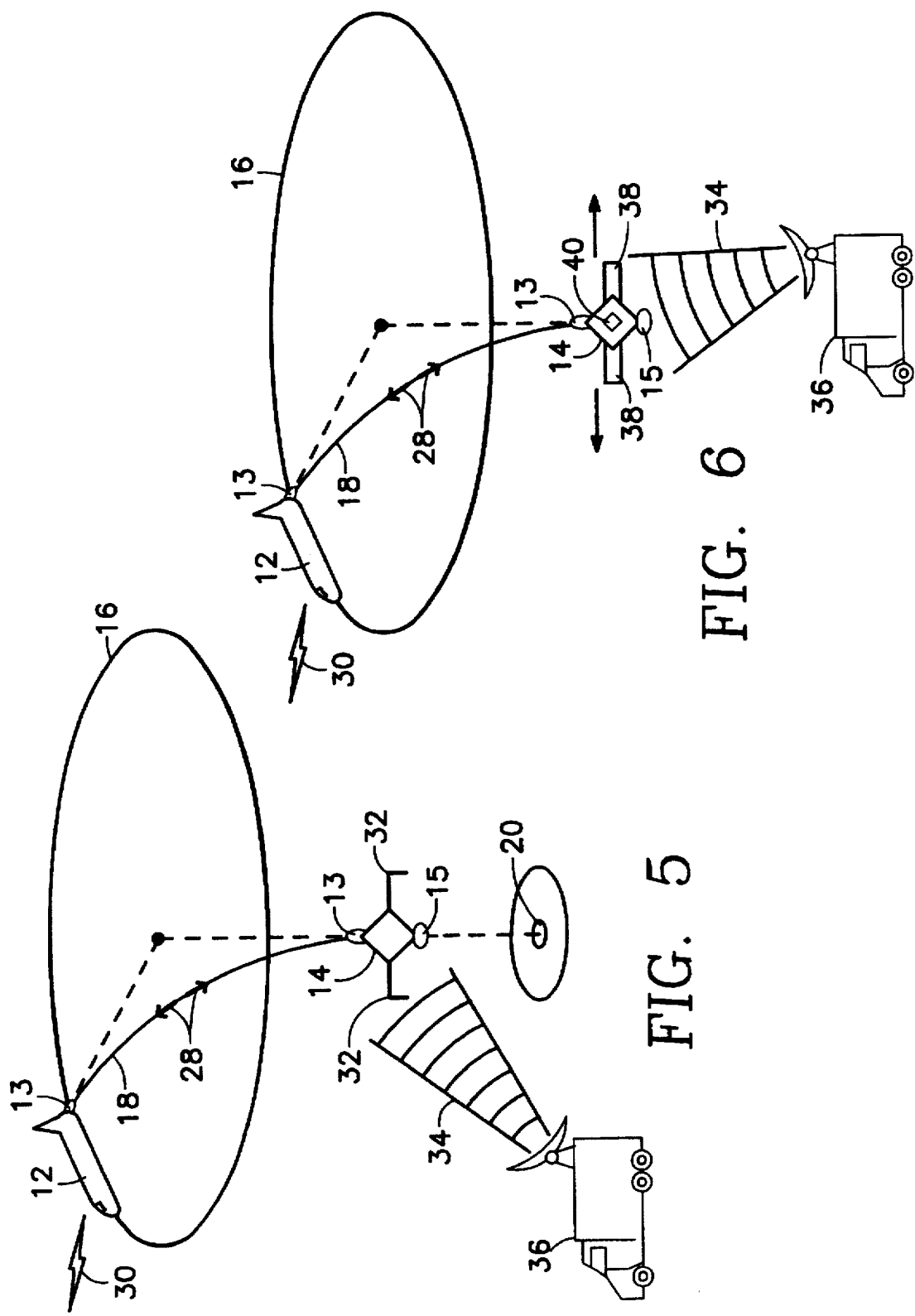
FIG. 5 is a diagram representing the positioning of a tethered payload section towed from an aircraft in a near-stationary horizontal position over a target employing electronic devices installed in the payload section for determining the location of the target.
FIG. 6 is a diagram representing the positioning of a tethered payload section towed from an aircraft in a near-stationary horizontal position over a target employing controllable thrust devices installed in the payload section for precisely placing and maintaining the position of the payload section in relation to the target.

Even though the above-described payload positioning systems, employing a GPS navigator 22, provide an improved precision placement of the payload section 14 over the current visual observation methods, they are ultimately limited by the accuracy of the GPS navigator 22 and the accuracy of the predetermined coordinates of the desired location 20. However, an even more accurate placement can be achieved by employing sensor data from sensor(s), or images received from video equipment, installed in the payload section 14. This embodiment of the present invention is depicted in FIG. 5.

Sensors 32, incorporated into the payload section 14 provide sensor data (e.g. EO/IR imaging, acoustic, RF, magnetic, electromagnetic, chemical, or radiation), via the communications link 28 in the tether 18, to the aircraft 12. This data is then used to determine if an offset exists between the desired location 20 over which the payload section 14 has been placed, and an intended target. For instance, assume the payload section 14 has been positioned over a suspected target location, i.e. the desired placement location 20, via the above-described methods employing a GPS navigator, or by visual observation. Data from sensors 32 designed to detect target emissions 34 indicate that the target, i.e. a mobile radar vehicle 36, is not at the suspected target location. The aircraft 12 can then be repositioned to place the payload section 14 closer (or further away if desired) to the intended target vehicle 36. If it is desired to move the payload section 14 closer to the target vehicle 36, the aircraft 12 is repositioned in the direction of the target signal 34 detected by the sensors 32. The aircraft 12 is repositioned in the opposite direction, if it is desired to move away from the target vehicle 36. Similar methods can be employed for many types of targets and sensors.

The same is true in the case of the aforementioned video equipment. In a sense, the video equipment is just another type of sensor detecting emanations from the target. In this case, light is reflected off the target. Images of the scene surrounding the suspected target location are used by the pilot or controller to place the payload section 14 in the desired relationship to the target. Again this may be at the target's location, or offset from it. In addition, the video equipment can be used to search for a target that is hidden. For instance, the payload section 14 might be repositioned so that the video equipment can be used to view under bridges, or through windows and doors, etc., i.e. places where the target may be found.

In some cases, the target may not emit any detectable signal, or the direction of the target may be discernible, but not its range. However, the detection and ranging of a target with the sensors 32 need not be a merely passive operation. The payload section 14 could also include signal emitting devices (not shown) which would emit a signal intended to bounce off the target and be detected by the sensors 32 in the payload section 14. For example, a radar emitter could be installed in the payload section 14 to scan for the target. The radar energy reflected off the target would then be detected by appropriate sensors 32 in the payload section 14. Another example would be a laser range finder. If the direction of a target is known, such as one discovered by monitoring the images from the aforementioned video equipment, the laser range finder can be used to determine the distance separating the payload section 14 and the target.

Atmospheric conditions, such as winds which are constantly varying in intensity or direction, could make the desired precision placement of the payload section 14 difficult, if repositioning the aircraft 12 is the sole method relied on to accomplish this payload placement. The winds would push the payload section 14 off target faster than could be corrected for by merely moving the aircraft 12. This difficulty can be minimized by including a controllable thrust device 38 in the payload section 14, as shown in FIG. 6. The aircraft 12 would be used to place the payload section 14 in the general area of the target 36, and then the controllable thrust device 38 would be employed to fine tune this placement.

The pilot or controller (or computer) would use either the GPS navigator or sensor data to place the payload section 14 in the desired location, as discussed previously. However, instead of just relying on the repositioning of the aircraft 12 to move the payload section 14, the controllable thrust device 38 will be used, as well. To accomplish this task, the pilot or controller (or computer) would cause a command signal to be transmitted to a thrust controller 40 in the payload section 14, via the communications link 28 in the tether 18. The command signal causes the thrust controller 40 to initiate the controllable thrust device 38 so as to move the payload section 14 in the desired horizontal direction in relation to the target 36, as indicated by the GPS navigator 22 or the sensor data. The aforementioned tether winch 13 would be used to compensate for any vertical oscillations of the payload section 14 caused by the varying winds. This process proceeds iteratively, until the payload section 14 reaches the correct location. Thereafter, the process continues to maintain the payload section 14 in this corrected location.

The controllable thrust device 38 can be a single thruster which is moved around the circumference of the payload section 14, or a series of stationary thrusters which are activated in combination to push the payload section 14 in the desired direction. In either case the thrust controller 40 provides the appropriate control signal. As both types of controllable thrust systems 38 and the associated thrust controller 40 are well known in the art, no further description is provided herein.

While the invention has been described in detail by reference to the preferred embodiments, it is understood that variations and modifications thereof may be made without departing from the true spirit and scope of the invention.

Wherefore, what is claimed is:

1. An airborne sensor system for placing a tethered payload in a near-stationary horizontal and vertical position at a desired location in relation to a target on the ground, comprising:
    (a) an aircraft flying in a near-circular flight path;
    (b) a tether connected at a first end to the aircraft;
    (c) a payload section connected to a second end of the tether; and,
    (d) an electronic sensor disposed in the payload section for determining the location of the payload section in relation to the ground.

2. The airborne sensor system according to claim 1, wherein the electronic sensor comprises
    a global positioning system navigator apparatus for determining the global coordinates of the payload section and for facilitating the repositioning of the aircraft such that the global coordinates of the payload section closely correspond to predetermined global coordinates of the desired location, thereby allowing for the placement of the payload section in the near-stationary horizontal position at approximately the desired location.

3. The airborne sensor system according to claim 2, further comprising:
    sensors disposed in the payload section for detecting emanations from the target and determining a location of the target in relation to the payload section, so as to facilitate a second repositioning of the aircraft to move a center of the near-circular flight path over one of (i) the target, or (ii) a location having a predetermined offset from the target, thereby allowing for the precision placement of the payload section in the near-stationary horizontal position in relation to the target.

4. The airborne sensor system according to claim 3, further comprising:
    (a) means for emitting reflective signals wherein the reflective signals reflect off of the target and are detected by the sensors disposed in the payload section.

5. The airborne sensor system according to claim 3, wherein the sensors include:
    video equipment for detecting reflected light emanating from the target.

6. The airborne sensor system according to claim 3 further comprising:
    (a) means for vertical repositioning the payload section in relation to the target; and wherein,
    (b) the electronic sensor further comprises a sensor for determining the altitude of the payload section and for facilitating vertical repositioning of the payload by the vertical repositioning means, thereby allowing for the precision placement the payload section in the near-stationary vertical position in relation to the target.

7. The airborne sensor system according to claim 6, wherein the vertical repositioning means comprises:

a winch disposed in the aircraft for reeling out the tether to lower the payload section from the aircraft, and for reeling in the tether to raise the payload section toward the aircraft.

8. The airborne sensor system according to claim 6, wherein the vertical repositioning means comprises:

a winch disposed in the payload section for reeling out the tether to lower the payload section away the aircraft, and for reeling in the tether to raise the payload section toward the aircraft.

9. The airborne sensor system according to claim 3, further comprising:

means for moving the payload section horizontally to a location and maintaining the payload section at the location, independent of moving the aircraft.

10. The airborne sensor system according to claim 9, wherein the moving means comprises:

(a) a controllable thrust device disposed in the payload section and rotatable about the circumference of the payload section; and, (b) means for controlling the thrust device so as allow the thrust device to be rotated to a point on the circumference of the payload section and activated, to push the payload section in a direction corresponding to the desired location and maintain the payload section at the desired location.

11. The airborne sensor system according to claim 9, wherein the moving means comprises:

(a) a plurality of controllable thrust devices disposed about the circumference of the payload section; and, (b) means for controlling the thrust devices, the controlling means being capable of causing at least one of the thrust devices to be activated so as to push the payload section in a direction corresponding to the desired location and maintain the payload section at the desired location.

12. The airborne sensor system according to claim 1, further comprising:

(a) means for vertical repositioning the payload section in relation to the target; and wherein, (b) the electronic sensor is adapted for determining the altitude of the payload section and for facilitating vertical repositioning of the payload by the vertical repositioning means, thereby allowing for the placement of the payload section in the near-stationary vertical position at approximately the desired location.

13. The airborne sensor system according to claim 12, wherein the vertical repositioning means comprises:

a winch disposed in the aircraft for reeling out the tether to lower the payload section from the aircraft, and for reeling in the tether to raise the payload section toward the aircraft.

14. The airborne sensor system according to claim 12, wherein the vertical repositioning means comprises:

a winch disposed in the payload section for reeling out the tether to lower the payload section away the aircraft, and for reeling in the tether to raise the payload section toward the aircraft.

15. The airborne sensor system according to claim 1, further comprising:

means for moving the payload section horizontally to a location corresponding to the desired location and maintaining the payload section at the desire location, independent of moving the aircraft.

16. The airborne sensor system according to claim 15, wherein the moving means comprises:

(a) a controllable thrust device disposed in the payload section and rotatable about the circumference of the payload section; and, (b) means for controlling the thrust device so as allow the thrust device to be rotated to a point on the circumference of the payload section and activated, to push the payload section in a direction corresponding to the desired location and maintain the payload section at the desired location.

17. The airborne sensor system according to claim 15, wherein the moving means comprises:

(a) a plurality of controllable thrust devices disposed about the circumference of the payload section; and, (b) means for controlling the thrust devices, the controlling means being capable of causing at least one of the thrust devices to be activated so as to push the payload section in a direction corresponding to the desired location and maintain the payload section at the desired location.

18. A method for placing a tethered payload in a near-stationary horizontal and vertical position at a desired location in relation to a target on the ground, comprising the steps of:

(a) flying an aircraft in a near-circular flight path;

(b) suspending a payload section from the aircraft on a tether connected at a first end to the aircraft and on a second end of the payload section;

(c) determining the location of the payload section in relation to the ground using an electronic sensor disposed in the payload section; and, (d) repositioning the payload section to minimize any difference existent between the location of the payload section and the desired location.

19. The method according to claim 18, wherein:

(a) the step of determining the location of the payload section comprises determining the global coordinates of the payload section with the electronic sensor, said electronic sensor comprising a global positioning system navigator apparatus; and, (b) the step of repositioning the payload section comprises utilizing the global coordinates of the payload section to reposition the aircraft such that the global coordinates of the payload section closely correspond to predetermined global coordinates of the desired location, thereby allowing for the placement of the payload section in the near-stationary horizontal position an approximately the desired location.

20. The method according to claim 19, further comprising the steps of:

(a) detecting emanations from the target using sensors disposed in the payload section capable of detecting said target emanations;

(b) determining a location of the target in relation to the payload section; and, (c) repositioning of the aircraft a second time to move a center of the near-circular flight path over one of (i) the target, or (ii) a location having a predetermined offset from the target, thereby allowing for the precision placement of the payload section in the near-stationary horizontal position at the desired location in relation to the target.

21. The method according to claim 20, further comprising the step of:

emitting reflective signals wherein the reflective signals reflect off of the target and are detected by the sensors disposed in the payload section.

22. The method according to claim 20, wherein:

(a) the step of determining the location of the payload section further comprises determining the altitude of the payload section using a sensor disposed in the payload section; and (b) the step of repositioning the payload section further comprises the step of changing at least one of (i) a length of the tether, (ii) a speed off the aircraft, (iii) an altitude of the aircraft, and (iv) a vertical position of the payload section using a vertical thruster device disposed in the payload section, such that the payload section is placed in the near-stationary vertical position at the desired location and wind-caused vertical oscillations of the payload section are minimized.

23. The method according to claim 20, further comprising the step of:

moving the payload section horizontally to a location corresponding to the desired location and maintaining the payload section at the desired location, independent of moving the aircraft.

24. The method according to claim 18 wherein:

(a) the step of determining the location of the payload section comprises determining the altitude of the payload section; and (b) the step of repositioning the payload section comprises the step of changing at least one of (i) a length of the tether, (ii) a speed off the aircraft, (iii) an altitude of the aircraft, and (iv) a vertical position of the payload section using a vertical thruster device disposed in the payload section, such that the payload section is placed in the near-stationary vertical position at the desired location and wind-caused vertical oscillations of the payload section are minimized.

25. The method according to claim 24 wherein the step of changing the length of the tether comprises:

reeling out the tether using a winch disposed in the aircraft to lower the payload section from the aircraft, and reeling in the tether with the winch to raise the payload section toward the aircraft.

26. The method according to claim 24 wherein the step of changing the length of the tether comprises:

reeling out the tether using a winch disposed in the payload section to lower the payload section away the aircraft, and reeling in the tether with the winch to raise the payload section toward the aircraft.

27. The method according to claim 24 wherein the step of changing the speed off the aircraft comprises:

(a) increasing the speed of the aircraft whenever the aircraft is flying downwind; and, (b) decreasing the speed of the aircraft whenever the aircraft is flying upwind.

28. The method according to claim 24 wherein the step of changing the altitude of the aircraft comprises:

(a) increasing the altitude of the aircraft whenever the aircraft is flying downwind; and, (b) decreasing the altitude of the aircraft whenever the aircraft is flying upwind.

29. The method according to claim 24 wherein the step of changing the vertical position of the payload section using a vertical thruster device, comprises:

activating the vertical thruster device to push the payload section vertically to a location corresponding to the desired location and maintaining the payload section at the desired location.

30. The method according to claim 18, further comprising the step of:

moving the payload section horizontally to a location corresponding to the desired location and maintaining the payload section at the desired location, independent of moving the aircraft.

31. The method according to claim 30, wherein the step of moving the payload section horizontally, independent of moving the aircraft, comprising:

employing a controllable thrust device disposed in the payload section and rotatable about the circumference of the payload section, and a means for controlling the thrust device so as to allow the thrust device to be rotated to a point on the circumference of the payload section and activated, to push the payload section in a direction corresponding to the desired location and maintain the payload section at the desired location.

32. The method according to claim 30, wherein the step of moving the payload section horizontally independent of moving the aircraft comprising:

employing a plurality of controllable thrust devices disposed about the circumference of the payload section, and a means for controlling the thrust devices, said controlling means being capable of causing at least one of the thrust devices to be activated so as to push the payload section in a direction corresponding to the desired location and maintain the payload section at the desired location.

* * * * *